United States Patent
Zhuo et al.

(10) Patent No.: US 11,216,476 B2
(45) Date of Patent: **\*Jan. 4, 2022**

(54) DATA PROCESSING METHOD, APPARATUS, AND DEVICE

(71) Applicant: ADVANCED NEW TECHNOLOGIES CO., LTD., Grand Cayman (KY)

(72) Inventors: Haizhen Zhuo, Hangzhou (CN); Honglin Qiu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 207 days.

This patent is subject to a terminal disclaimer.

(21) Appl. No.: 16/570,401

(22) Filed: Sep. 13, 2019

(65) Prior Publication Data

US 2020/0133949 A1 Apr. 30, 2020

(30) Foreign Application Priority Data

Oct. 26, 2018 (CN) .......................... 201811260305.0

(51) Int. Cl.
*G06F 16/00* (2019.01)
*G06F 16/2458* (2019.01)
*G06F 16/27* (2019.01)
*G06F 16/28* (2019.01)
*G06Q 20/40* (2012.01)
*H04L 9/32* (2006.01)

(52) U.S. Cl.
CPC .......... *G06F 16/2471* (2019.01); *G06F 16/27* (2019.01); *G06F 16/283* (2019.01); *G06Q 20/401* (2013.01); *H04L 9/32* (2013.01)

(58) Field of Classification Search
CPC .... G06F 16/2471; G06F 16/27; G06F 16/283; G06Q 20/401
See application file for complete search history.

(56) References Cited

U.S. PATENT DOCUMENTS

| | | | |
|---|---|---|---|
| 9,454,609 | B2 | 9/2016 | Gutlapalli et al. |
| 9,569,771 | B2 | 2/2017 | Lesavich et al. |
| 9,608,829 | B2 | 3/2017 | Spanos et al. |
| 10,608,829 | B1 * | 3/2020 | Yoshihama ........... H04L 9/3297 |
| 2008/0270372 | A1 | 10/2008 | Hsu et al. |

(Continued)

FOREIGN PATENT DOCUMENTS

| | | |
|---|---|---|
| CN | 105653981 A | 6/2016 |
| CN | 106991164 A | 7/2017 |

(Continued)

OTHER PUBLICATIONS

Written Opinion for PCT Application No. PCT/US2019/051052 dated Mar. 27, 2020.

(Continued)

*Primary Examiner* — Alexander Khong (57) ABSTRACT

Methods, systems, and devices, including computer programs encoded on computer storage media, for data processing are provided. One of the methods includes: receiving a query parameter; obtaining query result data from each of one or more predetermined data sources according to the query parameter; converting the query result data into target reliable data conforming to a predetermined data reliability protocol; and sending the target reliable data to a blockchain node.

20 Claims, 7 Drawing Sheets

(56) References Cited

U.S. PATENT DOCUMENTS

| | | |
|---|---|---|
| 2016/0275461 A1 | 9/2016 | Sprague et al. |
| 2016/0283920 A1 | 9/2016 | Fisher et al. |
| 2016/0292672 A1 | 10/2016 | Fay et al. |
| 2016/0342994 A1 | 11/2016 | Davis |
| 2017/0103468 A1 | 4/2017 | Orsini et al. |
| 2017/0264428 A1 | 9/2017 | Seger, II |
| 2017/0287090 A1* | 10/2017 | Hunn .................... G06Q 50/18 |
| 2018/0005186 A1 | 1/2018 | Hunn |
| 2018/0302417 A1 | 10/2018 | Wilson |
| 2019/0097813 A1 | 3/2019 | King |
| 2019/0132350 A1 | 5/2019 | Smith et al. |
| 2019/0266145 A1 | 8/2019 | Qiu et al. |
| 2019/0304578 A1 | 10/2019 | Kain et al. |
| 2019/0305935 A1 | 10/2019 | Qiu |
| 2019/0347654 A1 | 11/2019 | Lu et al. |
| 2019/0363874 A1 | 11/2019 | Shirley et al. |
| 2020/0026700 A1 | 1/2020 | Qiu |
| 2020/0042982 A1* | 2/2020 | Snow .................... H04L 9/0643 |
| 2020/0167336 A1* | 5/2020 | Somani ................ G06Q 20/223 |

FOREIGN PATENT DOCUMENTS

| | | |
|---|---|---|
| CN | 108389129 A | 8/2018 |
| CN | 108595720 A | 9/2018 |
| TW | 201837747 A | 10/2018 |
| WO | 2018059334 A1 | 4/2018 |
| WO | 2019213779 A1 | 11/2019 |

OTHER PUBLICATIONS

First Search for Chinese Application No. 201811260305.0 dated Feb. 21, 2020.

Written Opinion of the International Searching Authority and International Search Report for PCT Application No. PCT/US2019/051052 dated Nov. 22, 2019 (18 pages).

Gopie, "What are smart contracts on blockchain?—Blockchain Pulse: IBM Blockchain Blog," Jul. 2, 2018, retrieved from the internet: https://www.ibm.com/blogs/blockchain/2018/07/what-are-smart-contracts-on-blockchain/, retrieved on Oct. 23, 2019 (10 pages).

Preinterview First Office Action for U.S. Appl. No. 16/815,895 dated Jun. 17, 2020.

Written Opinion for PCT Application No. PCT/US2019/051052 dated Oct. 14, 2020.

Search Report for Taiwanese Application No. 108110895 dated Feb. 4, 2020.

* cited by examiner

DATA PROCESSING METHOD, APPARATUS, AND DEVICE

CROSS-REFERENCE TO RELATED APPLICATION

This application claims priority to the Chinese patent application No. 201811260305.0 filed on Oct. 26, 2018, and entitled "Data Processing Method, Apparatus, and Device", which is incorporated herein by reference in its entirety.

TECHNICAL FIELD

The specification relates to the technical field of computers and, in particular, relates to a data processing method, apparatus, and device.

BACKGROUND

A trusted computing system may have a plurality of data sources and may realize multi-dimensional computing, and the data sources may be from different entities during computing, such as businesses, institutions or organizations. The different institutions or organizations have different data storage technologies, such as a recordkeeping blockchain signed by multiple parties, a consortium blockchain of an account model, a consortium blockchain of a non-account model, and a traditional trusted storage.

In a traditional centralized computing platform, in order to perform trusted computing, data is generally obtained in the following way, that is, data of a plurality of data sources is migrated into a certain centralized platform system. In the process of obtaining the data in this way, the migration of the data sources is relatively cumbersome, and the reliability of the data cannot be guaranteed. Therefore, there is a need to provide a data processing solution which is more convenient, faster, more efficient and reliable in data processing.

SUMMARY

Embodiments of the specification provide a data processing method, apparatus, and device so as to provide a data processing solution which is more convenient, faster, more efficient, and reliable in data processing.

In one aspect, a data processing method is provided by the embodiments of the specification. The method may include: receiving a query parameter; obtaining query result data from each of one or more predetermined data sources according to the query parameter; converting the query result data into target reliable data conforming to a predetermined data reliability protocol; and sending the target reliable data to a blockchain node.

In another aspect, a data processing method is provided by the embodiments of the specification. The method may include: receiving target reliable data which is sent by a decentralized node and conforms to a predetermined data reliability protocol; parsing the target reliable data to obtain corresponding query result data; and performing logical computing on the query result data to obtain a target query result corresponding to a query parameter. The target reliable data is obtained by converting query result data according to the predetermined data reliability protocol, and the query result data is respectively obtained from each predetermined data source according to the query parameter.

In yet another aspect, a data processing apparatus is provided by the embodiments of the specification. The apparatus may include: a parameter receiving module configured to receive a query parameter; a result acquisition module configured to obtain query result data from each predetermined data source according to the query parameter; a data conversion module configured to convert the query result data into target reliable data conforming to a predetermined data reliability protocol; and a data sending module configured to send the target reliable data to a blockchain node.

In still another aspect, a data processing apparatus is provided by the embodiments of the specification. The apparatus may include: a data receiving module configured to receive target reliable data; a parsing module configured to parse the target reliable data to obtain corresponding query result data; and a query result determination module configured to perform logical computing on the query result data to obtain a target query result corresponding to the query parameter. The target reliable data may be sent by a decentralized node and conform to a predetermined data reliability protocol, and may be obtained by converting query result data according to the predetermined data reliability protocol. The query result data may be respectively obtained from each predetermined data source according to the query parameter.

According to another aspect of the specification, a data processing device is provided. The device may include one or more processors and one or more non-transitory computer-readable memories coupled to the one or more processors. The memories may be configured with instructions executable by the one or more processors to cause the device to perform operations. The operations may include receiving a query parameter; obtaining query result data from each of one or more predetermined data sources according to the query parameter; converting the query result data into target reliable data conforming to a predetermined data reliability protocol; and sending the target reliable data to a blockchain node.

According to a further aspect, the specification provides a data processing device including a processor and a memory configured to store computer executable instructions. When the executable instructions are executed, the processor is enabled to perform operations including: receiving target reliable data which is sent by a decentralized node and conforms to a predetermined data reliability protocol; parsing the target reliable data to obtain corresponding query result data; and performing logical computing on the query result data to obtain a target query result corresponding to a query parameter. The target reliable data is obtained by converting query result data according to the predetermined data reliability protocol, and the query result data is respectively obtained from each predetermined data source according to the query parameter.

According to yet another aspect, the specification provides a non-transitory computer-readable storage medium for data processing. The non-transitory computer-readable storage medium may store instructions executable by one or more processors to cause the one or more processors to perform operations. The operations may include receiving a query parameter; obtaining query result data from each of one or more predetermined data sources according to the query parameter; converting the query result data into target reliable data conforming to a predetermined data reliability protocol; and sending the target reliable data to a blockchain node.

According to the technical solutions provided by the embodiments of the specification, after the query parameter is received, the query result data may be respectively obtained from each predetermined data source according to the query parameter. The query result data can be converted into target reliable data conforming to the predetermined data reliability protocol. The target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data, and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of a computing result is improved.

BRIEF DESCRIPTION OF THE DRAWINGS

To describe the technical solutions in the embodiments of the specification more clearly, the following briefly introduces the accompanying drawings required for describing the embodiments. Apparently, the accompanying drawings in the following description show merely some embodiments of the specification, and a person of ordinary skill in the art may still derive other drawings from these accompanying drawings without creative efforts.

DETAILED DESCRIPTION OF THE INVENTION

Embodiments of the specification provide a data processing method, apparatus, and device. To enable a person skilled in the art to better understand the technical solutions of the specification, the technical solutions of the embodiments of the specification will be described clearly and thoroughly below with reference to the accompanying drawings of the embodiments of the specification. It is apparent that the described embodiments are merely some rather than all of the embodiments of the specification. All other embodiments obtained by a person of ordinary skill in the art based on the embodiments of the specification without creative efforts shall fall within the protection scope of the specification.

Embodiment 1

Figure 1:
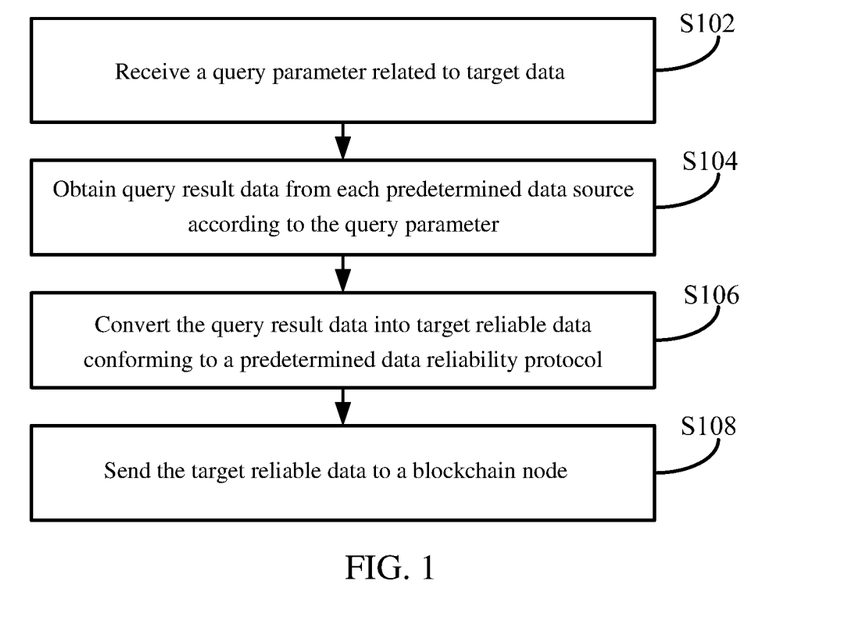
FIG. 1 is an embodiment of a data processing method of the specification.

As shown in FIG. 1, an embodiment of the specification provides a data processing method. The method may be executed by a decentralized node. The decentralized node may be a terminal device or a server. The terminal device may be a device such as a personal computer or a mobile terminal device, for example, a mobile phone and a tablet personal computer, and the terminal device may be a terminal device used by a user. The server may be an independent server or a server cluster composed of a plurality of servers, and the server may be a backend server for a certain business or a backend server for a certain website (such as an online shopping website or a payment application). The method may be used for converting data in certain data sources or databases into data with relatively high reliability. The method may include the following steps:

In step S102, a query parameter is received.

In some embodiments, the query parameter is related to target data. The target data may be any data, such as relevant data of a certain user, relevant data of any event or relevant data of any transaction. The query parameter may be a user ID, a keyword or keywords and the like.

In some embodiments, a blockchain may be interpreted as a data storage technology. A traditional database technology may include receiving written-in data, saving a data-written log into a database, and writing the data into the database. When the database loses data, the data may be restored by re-performing the data-written log. A blockchain data writing-in method is similar to the traditional method. Each block may record the data-written log of which data has been verified by the block, and may also store change information of a data state after the data-written log is performed. The blockchain may be a ledger, which is a decentralized distributed database. The blockchain has the following characteristics: decentralized, transparent, non-tamperable, and trustworthy. Each piece of data on the blockchain may be broadcast to blockchain nodes of the entire network, and each blockchain node has full and consistent data. Basic data such as a Hash value of a previous block, a transaction set of the block and the Hash of the block are recorded on each block in the blockchain. Each block has the Hash value of the previous block, and the blocks may be serially connected in pairs by Hash values to form a blockchain.

A trusted computing system may have a plurality of data sources and may perform multi-dimensional computing, and therefore, data sources may be from different entities during computing, such as businesses, institutions or organizations. While the different institutions or organizations have different data storage technologies, such as a recordkeeping blockchain signed by multiple parties: all data on the recordkeeping blockchain is uploaded after being endorsed and signed by a plurality of trusted organizations. The recordkeeping blockchain may be a public blockchain or a consortium blockchain, and all results are signed and authenticated by multiple parties. For a consortium blockchain of an account model, its platform mainly adopts an account model, and all operations on an account are completed by transactions. For a consortium blockchain of a non-account model, its platform links the data in a form of Hash-Value, and only a Hash value is required when querying. For a traditional trusted storage (OSS (Operation Support System), HDFS (Hadoop Distributed File System) and the like): the data of the traditional trusted storage is provided by a trusted party and may be directly queried by a key or unique identifier of the data.

In a traditional centralized computing platform, to perform trusted computing, data is generally obtained in the following two ways: 1. data of a plurality of data sources is migrated into a certain centralized platform system; and 2. a plurality of centralized data sources provide interfaces for use by a computing platform. In the first way, the migration of the data sources is relatively cumbersome, and the reliability of the data cannot be guaranteed. In the second way, a data source based on the blockchain is not considered, and the data reliability of the blockchain needs to pass various verifications such as SPV (Simplified Payment Verification) and signature verification.

With the development of blockchain technology, more and more data sources will be stored using blockchains. Due to the diversification of the blockchain structure, multi-chain technology can be used to store various data. In order to guarantee the reliability of the data, the transparency and non-tampering of a computing result, the specification provides a trusted blockchain computing platform solution as follows.

Figure 2:
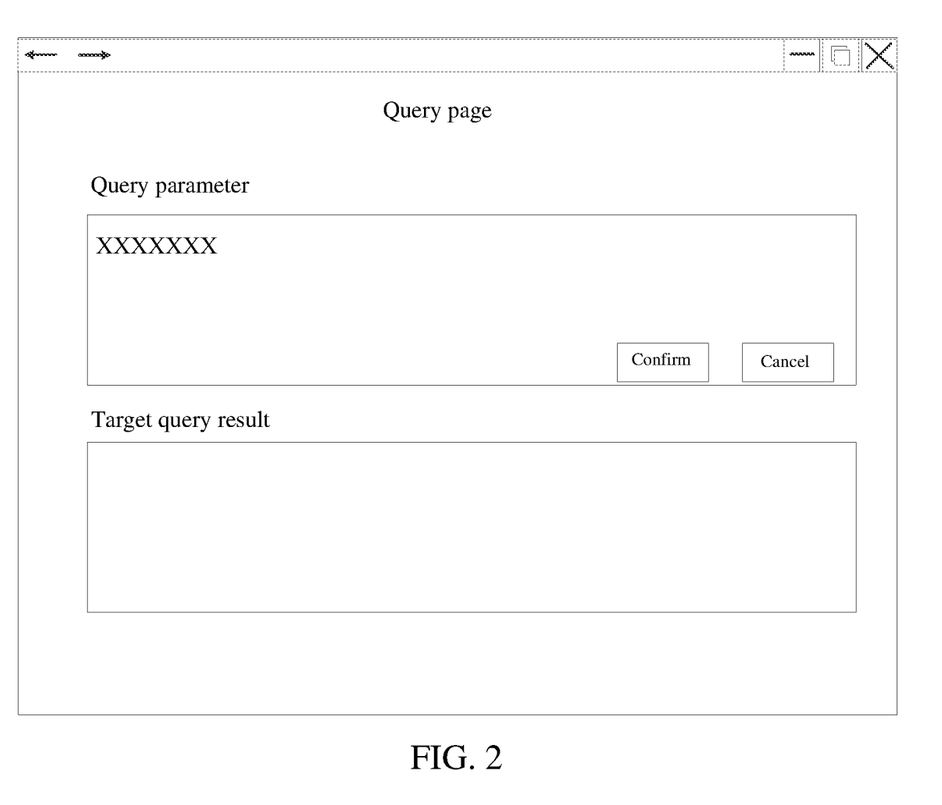
FIG. 2 is a schematic diagram of a query page of the specification.

A decentralized application (namely DApp) may be installed in the decentralized node. The decentralized application may be started when a query is performed or a certain query parameter to query relevant data is inputted. In some embodiments, the query can be performed by a manager or a technician. In some embodiments, the query parameter may be input by the manager or the technician. A server of the decentralized application may send corresponding webpage data to the decentralized application, and the decentralized application may display the received webpage data. As shown in FIG. 2, the webpage data may include an information input box and a display box of a query result. The query parameter data may be a certain user ID (such as a user name, an ID card number, a social security card number or a mobile phone number), a keyword, or keywords (such as a trading volume of a commodity A within one month). Thus, the target data is obtained by querying relevant data of a user or data related to the keyword or the keywords according to the query parameter data inputted.

In step S104, query result data is obtained from each predetermined data source according to the query parameter.

A plurality of predetermined data sources such as one or more of the recordkeeping blockchain signed by multiple parties, the consortium blockchain of the account model, the consortium blockchain of the non-account model and the traditional trusted storage mentioned in the step S102 may be included. In some embodiments, the recordkeeping blockchain signed by multiple parties, the consortium blockchain of the account model, the consortium blockchain of the non-account model and the traditional trusted storage correspond to servers or server clusters, and accordingly, the predetermined data source may include data in a Fabric cluster, data in an ETH cluster, data in a recordkeeping blockchain cluster of a non-account model, and Data in OSS and HDFS clusters.

In some embodiments, information such as a predetermined data source ID may be obtained after the decentralized application receives the query parameter data, then, a query request may be sent to each data source. The device where the data source is located may obtain the query data from the corresponding data source according to the query parameter, and send the query data to the decentralized application, so that the decentralized application may obtain the query data from each predetermined data source, and the obtained query data may form query result data.

In step S106, the query result data is converted into target reliable data conforming to a predetermined data reliability protocol.

The data reliability protocol may be determined according to an actual condition, and the data reliability protocol may be a UDAG (Unified Directed Acyclic Graph) protocol or a Merkle DAG protocol.

In some embodiments, the query result data may be obtained from the predetermined data sources. While the reliability of the data in the predetermined data sources may not be high, the obtained query result data may be converted into data with relatively high reliability by the predetermined data reliability protocol to guarantee the universality of the platform and the computing reliability. In some embodiments, data format information before and after the data conversion may be determined based on the relevant content of the predetermined data reliability protocol. The data format of the query result data may be converted into a data format corresponding to the data reliability protocol based on the format information of the converted data, as such the target reliable data conforming to the predetermined data reliability protocol can be obtained. In some embodiments, the target reliable data may be a UDAG request or a Merkle DAG request.

In step S108, the target reliable data is sent to a blockchain node.

Figure 3:
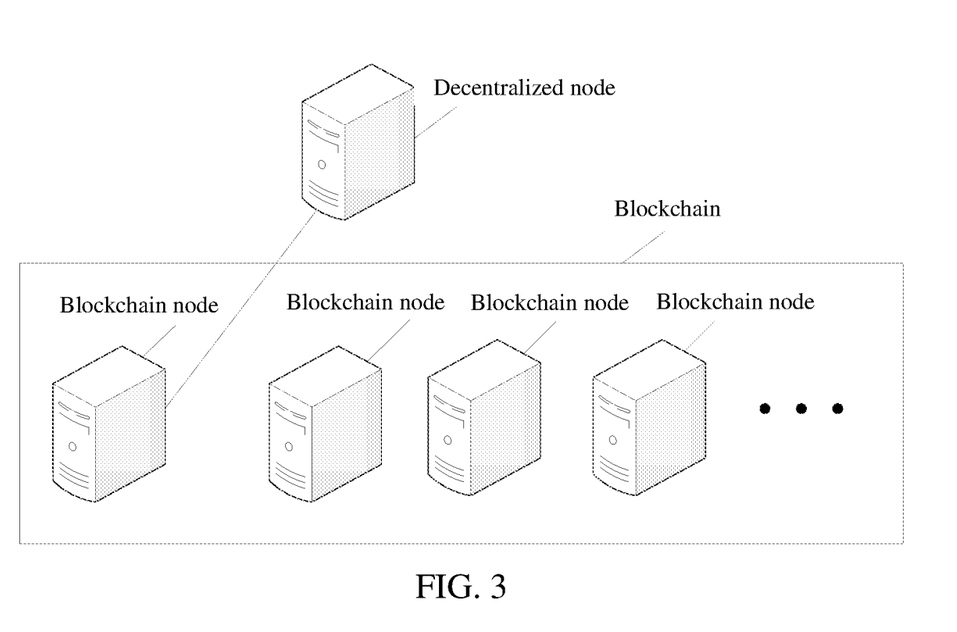
FIG. 3 is a structural schematic diagram of a data processing system of the specification.

In some embodiments, as shown in FIG. 3, the blockchain node may include a smart contract, the decentralized node may be used as data link service (namely Oracle) provided for the blockchain after obtaining the target reliable data, and the target reliable data (namely the UDAG request or the Merkle DAG request) is input to the smart contract by the decentralized node. In order to guarantee the reliability and non-tampering of the computing result, data verification and reliability computing may be performed by using the smart contract to obtain a corresponding result for user query.

An embodiment of the specification provides a data processing method. A query parameter is received, and then, the query result data may be obtained from each predetermined data source according to the query parameter. The query result data is converted into target reliable data conforming to the predetermined data reliability protocol, and the target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data, and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

Figure 4:
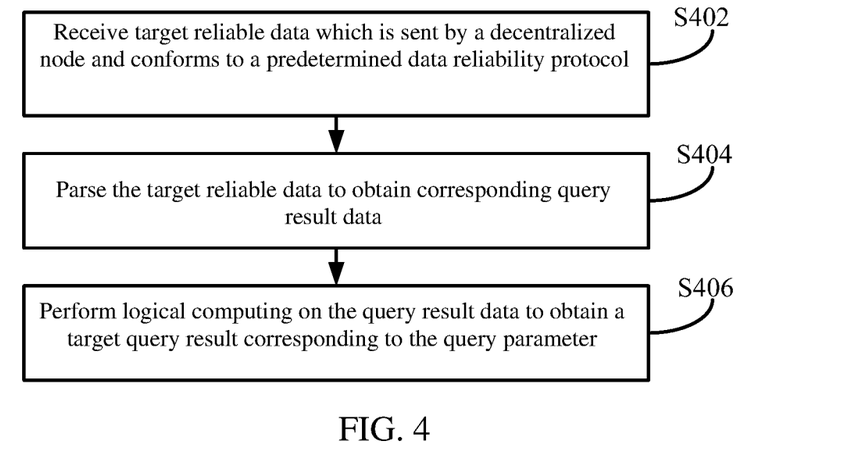
FIG. 4 is an embodiment of another data processing method of the specification.

As shown in FIG. 4, an embodiment of the specification provides a data processing method. The method may be executed by a blockchain node. The blockchain node may be a terminal device or a server. The terminal device may be a device such as a personal computer or a mobile terminal device such as a mobile phone and a tablet personal computer, and the terminal device may be a terminal device used by a user. The server may be an independent server or a server cluster composed of a plurality of servers, and the server may be a backend server for a certain business or a backend server for a certain website (such as an online shopping website or a payment application). The method may be used for converting data in certain data sources or databases into data with relatively high reliability. The method may include the following steps.

In step S402, target reliable data which is sent by a decentralized node and conforms to a predetermined data reliability protocol is received, the target reliable data is obtained by converting query result data according to the predetermined data reliability protocol, and the query result data is respectively obtained from each predetermined data source according to a query parameter.

The processing procedure of the step S402 may refer to relevant contents in the steps S102 to S108, and the descriptions thereof are not repeated herein.

In step S404, the target reliable data is parsed to obtain the corresponding query result data.

In some embodiments, the target reliable data (which may be a UDAG request or a Merkle DAG request) may be parsed after being received by the blockchain node, corresponding data may be obtained from a trusted node according to the relevant contents parsed from the target reliable data. For example, the corresponding data can be obtained from a trusted SPV node, a trusted ETH node, and a Fabric cluster node, and the obtained data may be combined as the corresponding query result data. The trusted node may be determined according to the blockchain, namely the blockchain node used as the trusted node may be selected through the blockchain.

In step S406, logical computing may be performed on the query result data to obtain a target query result corresponding to the query parameter.

In some embodiments, the logical computing includes multi-dimensional computing, the multi-dimensional computing may be performed on the obtained query result data to obtain the corresponding computing result, and the query result data is obtained from the trusted node in the blockchain. As such the reliability of the computing result obtained by multi-dimensional computing of the blockchain node is relatively high. The obtained computing result may be used as the target query result corresponding to the query parameter.

When the user queries the corresponding data by using the query parameter again, the blockchain node may directly send the target query result corresponding to the query parameter to the user and may guarantee the reliability of the target query result provided to the user.

An embodiment of the specification provides a data processing method. A query parameter is received, and the query result data may be respectively obtained from each predetermined data source according to the query parameter. The query result data is converted into the target reliable data conforming to the predetermined data reliability protocol, and the target reliable data may be sent to the blockchain node. As such a subsequent blockchain node may obtain the corresponding query result data through the target reliable data, and multi-dimensional computing may be performed on the corresponding query result data to obtain the target query result corresponding to the query parameter. By using the data of the plurality of data sources, the breath of computing sources is increased. A computing logic may be separated from the data, and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

Embodiment 2

Figure 5:
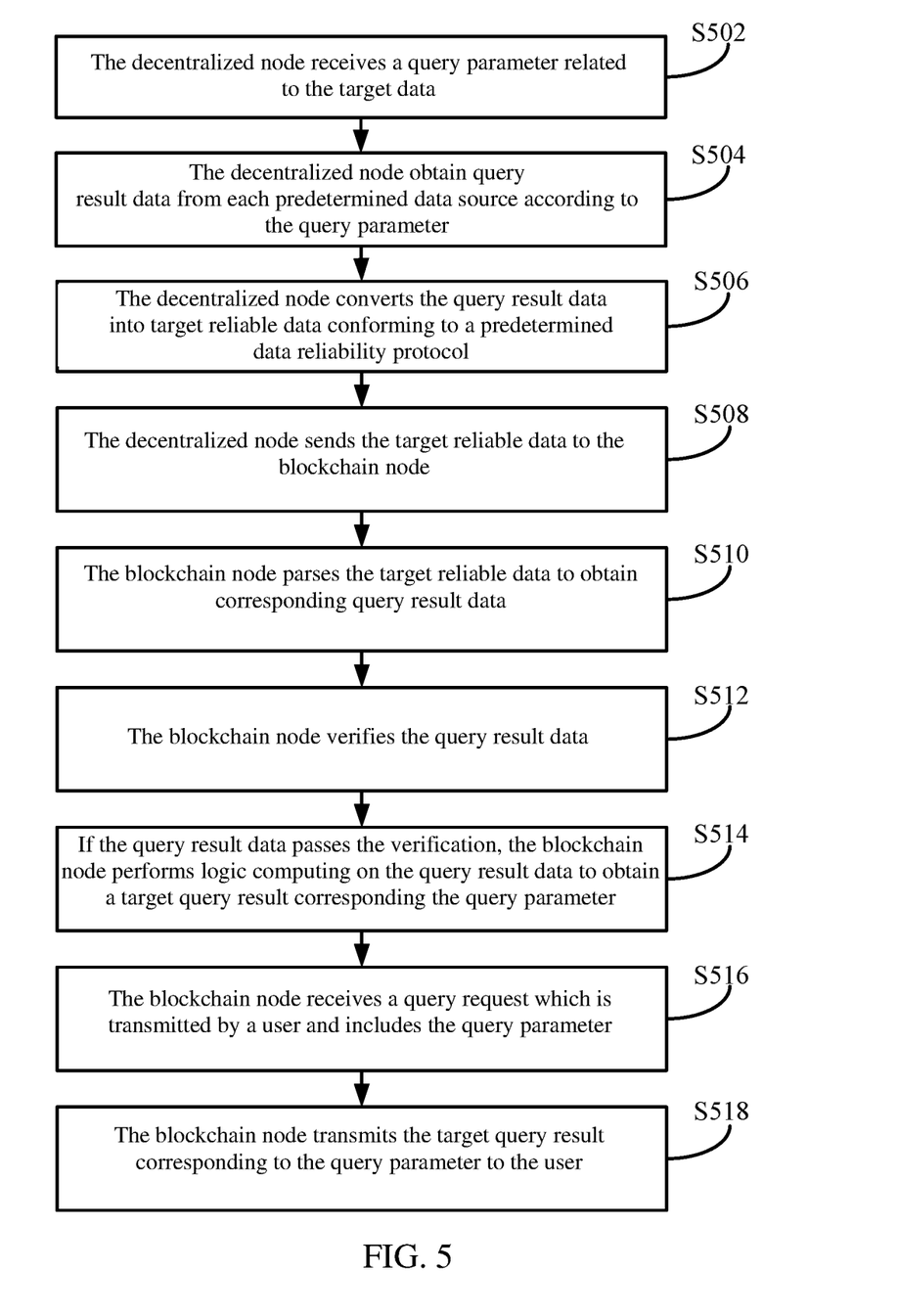
FIG. 5 is an embodiment of still another data processing method of the specification.

As shown in FIG. 5, an embodiment of the specification provides a data processing method. The method may be executed by a decentralized node and a blockchain node.

The decentralized node may be a terminal device or a server. The blockchain node may also be a terminal device or a server. The terminal device may be a device such as a personal computer or a mobile terminal device such as a mobile phone and a tablet personal computer, and the terminal device may be a terminal device used by a user. The server may be an independent server or a server cluster composed of a plurality of servers, and the server may be a backend server for a certain business or a backend server for a certain website (such as an online shopping website or a payment application). The method may be used for converting data in certain data sources or databases into data with relatively high reliability. The method may include the following steps.

In step S502, the decentralized node receives a query parameter.

In step S504, the decentralized node respectively obtains query result data from each predetermined data source according to the query parameter.

Figure 6:
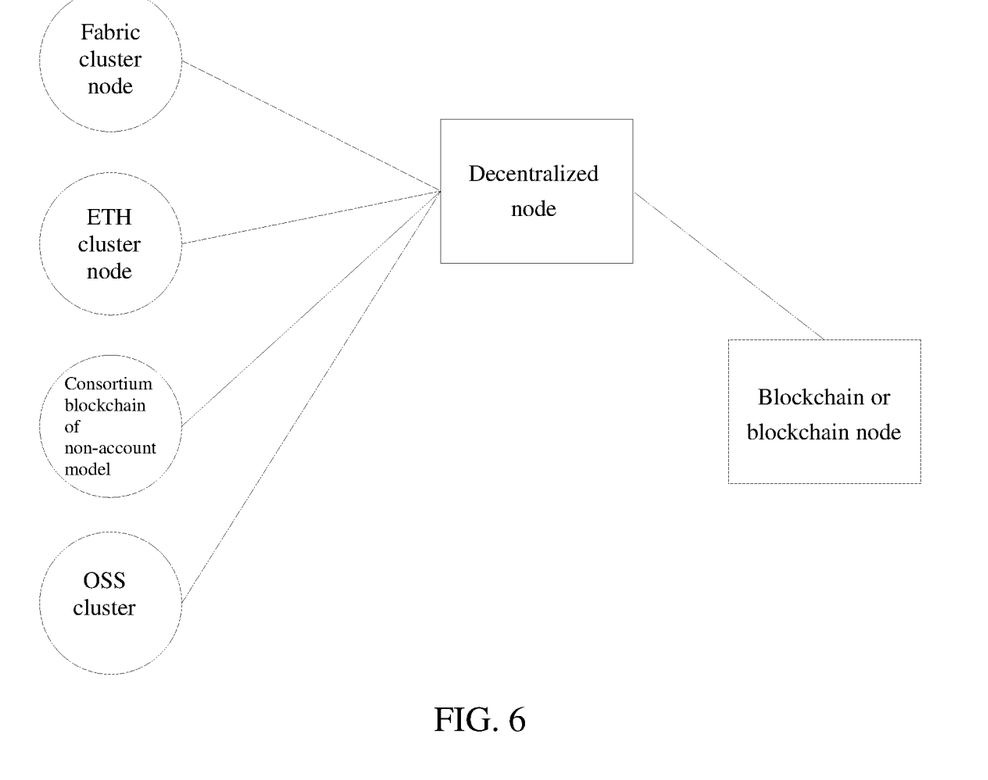
FIG. 6 is a logic structural schematic diagram of a data processing system of the specification.

As shown in FIG. 6, the data source may include one or more of the following: a data source based on an OSS, a data source based on an HDFS, a data source based on a private blockchain, a data source based on a consortium blockchain, and a data source based on a public blockchain. The consortium blockchain may be a blockchain used among organizations or may be only used for members in a certain group and limited third parties. A plurality of preselected nodes can be designated as accounters in the consortium blockchain. The generation of each block can be determined together by all the preselected nodes. Other access nodes may participate in a transaction, but not the accounting process. Other third parties may perform limited query through an open API in the blockchain. The public blockchain may be a blockchain that anyone can read and send transactions, the transaction can be effectively verified, and the public blockchain can also participate in a consensus process. The private blockchain may be a blockchain that is open to an individual or an entity. The consortium blockchain may include a consortium blockchain of an account model, a consortium blockchain of a non-account model and the like. The data source may include a recordkeeping blockchain signed by multiple parties, and the recordkeeping blockchain signed by multiple parties may belong to the public blockchain or the consortium blockchain and the like.

As there can be a plurality of data sources, the obtained query result data may include a plurality of data. For example, the query result data includes one or more of the following: ReadWriteSet data in a Fabric cluster node, SPV data in an ETH cluster node, transaction information stored on the consortium blockchain of the non-account model, and corresponding data in an OSS cluster. The Fabric cluster node may be one or more nodes in the recordkeeping blockchain signed by multiple parties, and the ETH cluster node may be one or more nodes in the consortium blockchain of the account model.

In step S506, the decentralized node converts the query result data into target reliable data conforming to a predetermined data reliability protocol.

The data reliability protocol may include a UDAG protocol, a Merkle DAG protocol and the like.

In step S508, the decentralized node sends the target reliable data to the blockchain node.

The processing procedures of steps S502 to S508 may refer to relevant contents in the Embodiment 1, and the descriptions thereof are not repeated herein.

In step S510, the blockchain node parses the target reliable data to obtain corresponding query result data.

In some embodiments, the reliability of the data of the blockchain requires to be verified by various verification solutions such as SPV and signature. Therefore, the query result data may be verified after being obtained by the blockchain node, and the description may refer to the processing in step S512 and step S514.

In step S512, the blockchain node verifies the query result data.

In some embodiments, based on the relevant contents, the query result data may include data of a plurality of different data sources, such as the ReadWriteSet data, the SPV data, the transaction information, and the corresponding data. The different data may be respectively verified, namely the ReadWriteSet data, the SPV data, the transaction information, the corresponding data and the like may be verified. In one embodiment, each kind of data in the query result data may be respectively verified; in another embodiment, a designated kind of data in the query result data may be verified (for example, only the SPV data in the query result data is verified). The verification manner may be determined according to an actual situation, and is not limited in the embodiments of the specification.

In some embodiments, if each kind of data required to be verified passes the verification, the processing in the step S514 may be performed. In some other embodiments, if none of data required to be verified passes the verification, the date in the query result data may be determined as having poor reliability. Accordingly, relevant prompt information may be sent to determine the relevant causes and restart the processing procedure. In one embodiment, the relevant prompt information may be sent to a manager or a technician so as to prompt the manager or the technician to determine the relevant causes in time and restart the processing procedure. In yet some other embodiments, if part of data required to be verified does not pass the verification, the data in the query result data may be determined as having relatively poor reliability. Accordingly, relevant prompt information may be sent to the manager or the technician, and the relevant information of the data with relatively poor reliability is sent to the manager or the technician and the like.

In step S514, if the query result data passes the verification, the blockchain node performs logical computing on the query result data to obtain a target query result corresponding to the query parameter.

In some embodiments, if each kind of data required to be verified passes the verification, the blockchain node may perform multi-dimensional computing on the query result data to obtain the target query result corresponding to the query parameter.

In some embodiments, the reliability of the data in the target query result is relatively high after the target query result corresponding to the query parameter is obtained, and the target query result and the query parameter may be correspondingly stored. When the blockchain node receives the query parameter again, the target query result corresponding to the query parameter may be directly found from the stored data and provided to a queryer, and the description may refer to the processing in step S516 and step S518.

In step S516, the blockchain node receives a query request which is sent by a user and includes the query parameter.

The user may be any user requiring the blockchain or the blockchain node to provide relevant service (such as relevant service of a payment transaction).

In some embodiments, the user's terminal device may include an application program, and the user may obtain corresponding data or corresponding service and the like from the corresponding blockchain or blockchain node. When the user needs to query certain data (namely the data of the target query result), the query parameter may be input. After the input is completed, the terminal device may be triggered to obtain the query parameter by a relevant operation such as clicking, and the corresponding query request is generated and may be sent to the blockchain node. The blockchain node may receive the query request.

In step S518, the blockchain node sends the target query result corresponding to the query parameter to the user.

In some embodiments, after receiving the query request, the blockchain node may extract the query parameter, and then, may determine whether the stored data includes the query parameter. If yes, the target query result corresponding to the query parameter may be obtained and provided to the user. As such, not only may the corresponding query result be quickly obtained for the user, but also the reliability of the query result provided to the user may be guaranteed.

The specification provides a data processing method. The query parameter is received, and the query result data may be respectively obtained from each predetermined data source according to the query parameter. The query result data is converted into the target reliable data conforming to the predetermined data reliability protocol, and the target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data, and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

Embodiment 3

Figure 7:
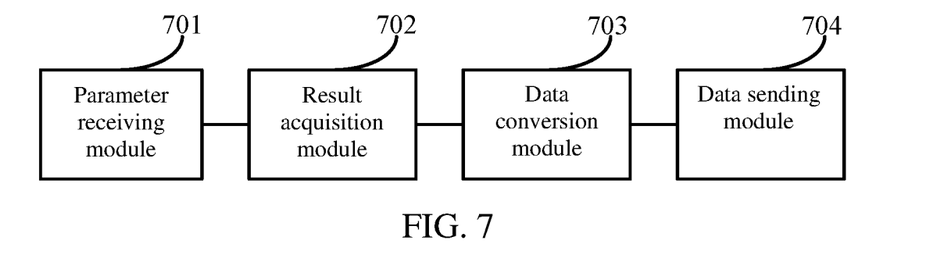
FIG. 7 is an embodiment of a data processing apparatus of the specification.

The data processing method provided by the embodiments of the specification is described above, based on the same consideration, an embodiment of the specification further provides a data processing apparatus as shown in FIG. 7.

The data processing apparatus includes a parameter receiving module 701, a result acquisition module 702, a data conversion module 703, and a data sending module 704. The parameter receiving module 701 is configured to receive a query parameter; the result acquisition module 702 is configured to obtain query result data from each predetermined data source according to the query parameter; the data conversion module 703 is configured to convert the query result data into target reliable data conforming to a predetermined data reliability protocol; and the data sending module 704 is configured to send the target reliable data to a blockchain node.

In some embodiments, the data source includes one or more of the following: a data source based on an operation support system (OSS), a data source based on a hadoop distributed file system (HDFS), a data source based on a private blockchain, a data source based on a consortium blockchain, and a data source based on a public blockchain.

In some other embodiments, the data reliability protocol includes a unified directed acyclic graph (UDAG) protocol.

In yet other embodiments, the query result data includes one or more of the following: ReadWriteSet data in a Fabric cluster node, simplified payment verification (SPV) data in an ETH cluster node, transaction information stored on a consortium blockchain of a non-account model, and corresponding data in an OSS cluster.

The specification provides a data processing apparatus. The query parameter is received, and the query result data may be respectively obtained from each predetermined data source according to the query parameter. The query result data is converted into the target reliable data conforming to the predetermined data reliability protocol, and the target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data; and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

Embodiment 4

Figure 8:
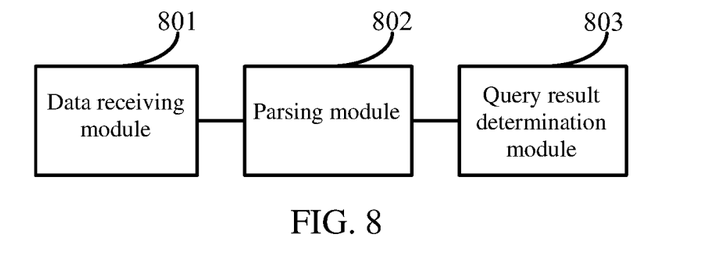
FIG. 8 is an embodiment of another data processing apparatus of the specification.

Based on the same consideration, the specification further provides a data processing apparatus as shown in FIG. 8.

The data processing apparatus includes a data receiving module 801, a parsing module 802, and a query result determination module 803. The data receiving module 801 is configured to receive target reliable data sent by a decentralized node, and the target reliable data conforms to a predetermined data reliability protocol, and is obtained by converting query result data according to the predetermined data reliability protocol. The query result data is respectively obtained from each predetermined data source according to a query parameter. The parsing module 802 is configured to parse the target reliable data to obtain corresponding query result data. The query result determination module 803 is configured to perform logical computing on the query result data to obtain a target query result corresponding to the query parameter.

In some embodiments, the apparatus further includes: a request receiving module, configured to receive a query request sent by a user and including the query parameter; and a result sending module, configured to send a target query result corresponding to the query parameter to the user.

In some other embodiments, the apparatus further includes: a verification module, configured to verify the query result data. If the query result data passes the verification, the query result determination module 803 may be configured to perform logical computing on the query result data to obtain the target query result corresponding to the query parameter.

The specification provides a data processing apparatus. The query parameter is received, and the query result data may be respectively obtained from each predetermined data source according to the query parameter. The query result data is converted into the target reliable data conforming to the predetermined data reliability protocol, and the target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data; and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

Embodiment 5

Figure 9:
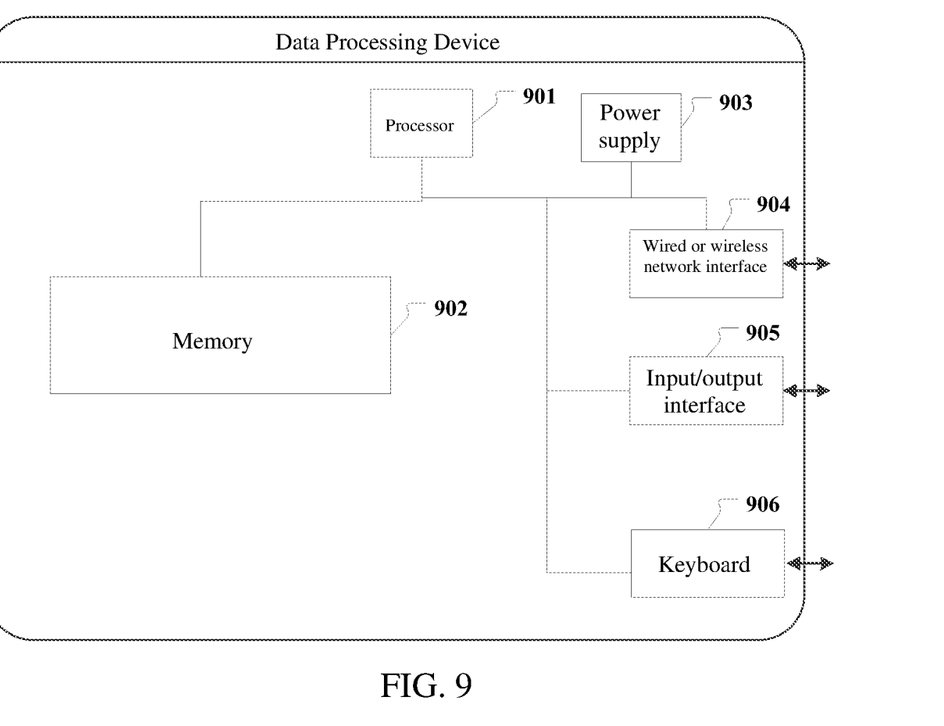
FIG. 9 is an embodiment of a data processing device of the specification.

The data processing apparatus provided by the specification is described above, based on the same consideration, the specification further provides a data processing device as shown in FIG. 9.

The data processing device may be the decentralized node provided in some embodiments.

The data processing device may vary with different configurations or performance and may include one or more than one processor 901 and memory 902, the memory 902 may store one or more than one application program or data, where the memory 902 may realize short-time storage or persistent storage. Each application program stored in the memory 902 may include one or more than one module (not shown in figures), each module may include a series of computer executable instructions in the data processing device. Furthermore, the processor 901 may be configured to communicate with the memory 902, and the series of computer executable instructions in the memory 902 are executed on the data processing device. The data processing device may further include one or more than one power supply 903, one or more than one wired or wireless network interface 904, one or more than one input/output interface 905, and one or more than one keyboard 906.

In some other embodiments, the data processing device includes a memory and one or more than one program, where the one or more than one program is stored in the memory and may include one or more than one module, each module may include a series of computer executable instructions in the data processing device, and the computer executable instructions contained in the one or more than one program are executed by the one or more than one processor by configuration. The instructions may include: receiving a query parameter; respectively obtaining query result data from each predetermined data source according to the query parameter; converting the query result data into target reliable data conforming to a predetermined data reliability protocol; and sending the target reliable data to a blockchain node.

In yet other embodiments, the data source includes one or more of the following: a data source based on an operation support system (OSS), a data source based on a hadoop distributed file system (HDFS), a data source based on a private blockchain, a data source based on a consortium blockchain, and a data source based on a public blockchain.

In still other embodiments, the data reliability protocol includes a unified directed acyclic graph (UDAG) protocol.

In one embodiment, the query result data includes one or more of the following: ReadWriteSet data in a Fabric cluster node, simplified payment verification (SPV) data in an ETH cluster node, transaction information stored on a consortium blockchain of a non-account model, and corresponding data in an OSS cluster.

The specification provides a data processing device. The query parameter is received, and the query result data may be respectively obtained from each predetermined data source according to the query parameter. The query result data is converted into the target reliable data conforming to the predetermined data reliability protocol, and the target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data, and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

Embodiment 6

Figure 10:
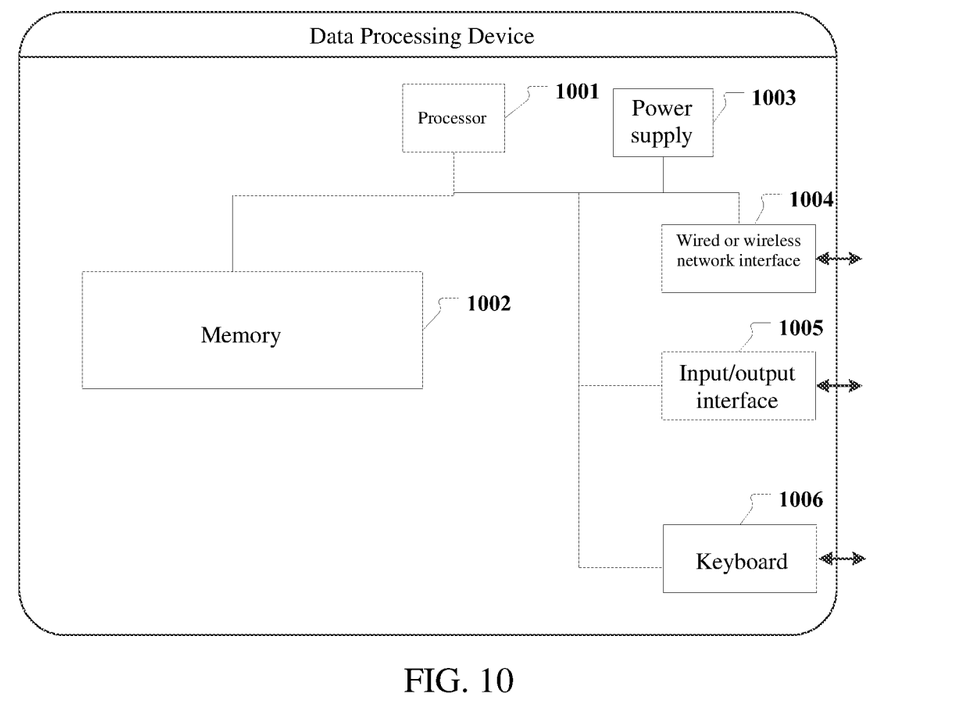
FIG. 10 is an embodiment of another data processing device of the specification.

Based on the same consideration, an embodiment of the specification further provides a data processing device as shown in FIG. 10.

The data processing device may be the blockchain node provided in the embodiment.

The data processing device may vary with different configurations or performance and may include one or more than one processor 1001 and a memory 1002, the memory 1002 may store one or more than one application program or data, where the memory 1002 may realize short-time storage or persistent storage. Each application program stored in the memory 1002 may include one or more than one module (not shown in figures), each module may include a series of computer executable instructions in the data processing device. Furthermore, the processor 1001 may be configured to communicate with the memory 1002, and the series of computer executable instructions in the memory 1002 are executed on the data processing device. The data processing device may further include one or more than one power supply 1003, one or more than one wired or wireless network interface 1004, one or more than one input/output interface 1005, and one or more than one keyboard 1006.

In some embodiments, the data processing device includes a memory and one or more than one program, where the one or more than one program is stored in the memory and may include one or more than one module, each module may include a series of computer executable instructions in the data processing device, and the computer executable instructions contained in the one or more than one program are executed by the one or more than one processor by configuration. The instructions may include: receiving target reliable data sent by a decentralized node. The target reliable data may conform to a predetermined data reliability protocol, and may be obtained by converting query result data according to the predetermined data reliability protocol. The query result data may be respectively obtained from each predetermined data source according to a query parameter.

The instructions may further include: parsing the target reliable data to obtain corresponding query result data; and performing logical computing on the query result data to obtain a target query result corresponding to the query parameter.

In some other embodiments, the instruction may further include: receiving a query request sent by a user and including the query parameter; and sending the target query result corresponding to the query parameter to the user.

In yet other embodiments, after parsing the target reliable data to obtain the corresponding query result data, the instructions may further include: verifying the query result data; and performing logical computing on the query result data to obtain a target query result corresponding to the query parameter.

In still other embodiments, the instructions may include: if the query result data passes the verification, performing logical computing on the query result data to obtain the target query result corresponding to the query parameter.

The specification provides a data processing device. The query parameter is received, and the query result data may be respectively obtained from each predetermined data source according to the query parameter. The query result data is converted into the target reliable data conforming to the predetermined data reliability protocol, and the target reliable data may be sent to the blockchain node. As such, a subsequent blockchain node may obtain the corresponding query result data through the target reliable data, and perform multi-dimensional computing on the corresponding query result data to obtain the target query result corresponding to the query parameter. By using the data of the plurality of data sources, the breadth of computing sources is increased. The computing logic may be separated from the data; and the decentralized node is used as a footstone for allowing the data to enter the blockchain, thus simplifying the processing of the blockchain. The data reliability protocol is used for certifying data reliability, so that the logic and rules cannot be falsified, the reliability of the data can be guaranteed, and the reliability of the computing result can be improved.

The specification further provides a non-transitory computer-readable storage medium for data processing. The non-transitory computer-readable storage medium may store instructions executable by one or more processors causing the one or more processors to perform operations. The operations may include receiving a query parameter; obtaining query result data from each of one or more predetermined data sources according to the query parameter; converting the query result data into target reliable data conforming to a predetermined data reliability protocol; and sending the target reliable data to a blockchain node.

The foregoing describes specific embodiments of the specification. Other embodiments fall within the scope of the appended claims. In some cases, the acts or steps described in the claims may be performed in a different order than that in the embodiments and can still achieve the desired results. In addition, the processes depicted in the accompanying drawings do not necessarily require a particular order or sequential order shown in order to achieve the desired results. In some embodiments, multitasking and parallel processing are also possible or may be advantageous.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, when one or more embodiments of the specification are implemented, functions of the units can be implemented in one or more types of software and/or hardware.

A person skilled in the art should understand that the embodiments of the specification may be provided as a method, a system, or a computer program product. Therefore, one or more embodiments of the specification can use a form of hardware only embodiments, software only embodiments, or embodiments combining software and hardware. Moreover, one or more embodiments of the present invention may use a form of a computer program product that is implemented on one or more computer-usable storage media (including but not limited to a disk memory, a CD-ROM, an optical memory, and the like) that include computer-usable program code.

The embodiments of the specification are described with reference to the flowcharts and/or block diagrams of the method, the device (system), and the computer program product according to the embodiments of the specification. It should be understood that computer program instructions may be used for implementing each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may further be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one . . . " does not exclude other same elements in the process, method, article or device which include the element.

A person skilled in the art should understand that the embodiments of the specification may be provided as a method, a system, or a computer program product. Therefore, one or more embodiments of the specification can use a form of hardware only embodiments, software only embodiments, or embodiments combining software and hardware. Moreover, one or more embodiments of the specification may use a form of a computer program product that is implemented on one or more computer-usable storage media (including but not limited to a disk memory, a CD-ROM, an optical memory, and the like) that include computer-usable program code.

One or more implementations of the specification can be described in the general context of computer executable instructions executed by a computer, for example, a program module. Generally, the program module includes a routine, a program, an object, a component, a data structure, and the like for executing a particular task or implementing a particular abstract data type. One or more embodiments of the specification can also be practiced in a distributed computing environment in which tasks are performed by remote processing devices that are connected through a communication network. In a distributed computing environment, the program module may be located in both local and remote computer storage media including storage devices.

The embodiments of the specification are all described in a progressive manner. For same or similar parts in the embodiments, reference may be made to these embodiments. Each embodiment focuses on a difference from other embodiments. Especially, a system embodiment is basically similar to a method embodiment, and therefore is described briefly; for related parts, reference may be made to partial descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. A data processing method for transferring data from different predetermined data sources that employ different data storage technologies to a blockchain for storage and for improving reliability, comprising:
   receiving, by a decentralized node, a query parameter corresponding to target data;
   obtaining, by the decentralized node, different pieces of query result data corresponding to the target data from each of the different predetermined data sources that employ different data storage technologies according to the query parameter;
   converting, by the decentralized node, the different pieces of query result data into target reliable data conforming to a predetermined data reliability protocol by converting a data format of each of the different pieces of query result data; and
   sending, by the decentralized node, the target reliable data to a blockchain node for storage in the blockchain.

2. The method according to claim 1, wherein the predetermined data sources that employ different data storage technologies include: a data source based on an operation support system (OSS), a data source based on a hadoop distributed file system (HDFS), a data source based on a private blockchain, a data source based on a consortium blockchain, and a data source based on a public blockchain.

3. The method according to claim 1, wherein the query result data includes: ReadWriteSet data in a Fabric cluster node, simplified payment verification (SPV) data in an Ethereum (ETH) cluster node, transaction information stored on a consortium blockchain of a non-account model, and corresponding data in an OSS cluster.

4. The method according to claim 1, further comprising:
   receiving, by the blockchain node, the target reliable data from the decentralized node;
   parsing, by the blockchain node, the target reliable data to obtain the query result data; and
   performing, by the blockchain node, computing on the query result data to obtain a target query result corresponding to the query parameter.

5. The method according to claim 4, further comprising:
   receiving, by the blockchain node from a user, a query request comprising the query parameter; and
   sending, by the blockchain node, the target query result corresponding to the query parameter to the user.

6. The method according to claim 4, wherein performing the computing on the query result data to obtain the target query result corresponding to the query parameter comprises:
   verifying, by the blockchain node, the query result data; and
   when determining the query result data passes the verification, performing, by the blockchain node, the computing on the query result data to obtain the target query result corresponding to the query parameter.

7. The method according to claim 6, wherein the computing includes multi-dimensional computing.

8. The method according to claim 1, further comprising storing, by the blockchain node, the target reliable data in a smart contract in the blockchain.

9. The method according to claim 1, wherein the predetermined data reliability protocol includes a unified directed acyclic graph (UDAG) protocol or a Merkle DAG protocol.

10. The method according to claim 9, wherein the target reliable data is a UDAG request or a Merkle DAG request.

11. A data processing device for transferring data from different predetermined data sources that employ different data storage technologies to a blockchain for storage and for improving reliability, comprising one or more processors and one or more non-transitory computer-readable memories coupled to the one or more processors and configured with instructions executable by the one or more processors to perform operations comprising:
  receiving a query parameter corresponding to target data;
  obtaining different pieces of query result data corresponding to the target data from each of the different predetermined data sources that employ different data storage technologies according to the query parameter;
  converting the different pieces of query result data into target reliable data conforming to a predetermined data reliability protocol by converting a data format of each of the different pieces of query result data; and
  sending the target reliable data to a blockchain node for storage in the blockchain.

12. The device according to claim 11, wherein the predetermined data sources that employ different data storage technologies include: a data source based on an operation support system (OSS), a data source based on a hadoop distributed file system (HDFS), a data source based on a private blockchain, a data source based on a consortium blockchain, and a data source based on a public blockchain.

13. The device according to claim 11, wherein the query result data includes: ReadWriteSet data in a Fabric cluster node, simplified payment verification (SPV) data in an Ethereum (ETH) cluster node, transaction information stored on a consortium blockchain of a non-account model, and corresponding data in an OSS cluster.

14. The device according to claim 11, wherein the operations further comprise:
  receiving the target reliable data;
  parsing the target reliable data to obtain the query result data; and
  performing computing on the query result data to obtain a target query result corresponding to the query parameter.

15. The device according to claim 14, wherein the operations further comprise:
  receiving a query request comprising the query parameter from a user; and
  sending the target query result corresponding to the query parameter to the user.

16. The device according to claim 14, wherein performing the computing on the query result data to obtain the target query result corresponding to the query parameter comprises:
  verifying the query result data; and
  when determining the query result data passes the verification, performing computing on the query result data to obtain the target query result corresponding to the query parameter.

17. The device according to claim 16, wherein the computing includes multi-dimensional computing.

18. A non-transitory computer-readable storage medium for transferring data from different predetermined data sources that employ different data storage technologies to a blockchain for storage and for improving reliability, the non-transitory computer-readable storage medium storing instructions executable by one or more processors to cause the one or more processors to perform operations comprising:
  receiving a query parameter corresponding to target data;
  obtaining different pieces of query result data corresponding to the target data from each of the different predetermined data sources that employ different data storage technologies according to the query parameter;
  converting the different pieces of query result data into target reliable data conforming to a predetermined data reliability protocol by converting a data format of each of the different pieces of query result data; and
  sending the target reliable data to a blockchain node for storage in the blockchain.

19. The non-transitory computer-readable storage medium according to claim 18, wherein the predetermined data sources that employ different data storage technologies include: a data source based on an operation support system (OSS), a data source based on a hadoop distributed file system (HDFS), a data source based on a private blockchain, a data source based on a consortium blockchain, and a data source based on a public blockchain.

20. The non-transitory computer-readable storage medium according to claim 18, wherein the query result data includes: ReadWriteSet data in a Fabric cluster node, simplified payment verification (SPV) data in an Ethereum (ETH) cluster node, transaction information stored on a consortium blockchain of a non-account model, and corresponding data in an OSS cluster.

* * * * *